US012488726B2

(12) United States Patent
Chang

(10) Patent No.: US 12,488,726 B2
(45) Date of Patent: Dec. 2, 2025

(54) DISPLAY PANELS, COMPENSATION METHODS THEREOF, DEVICES FOR GENERATING COMPENSATION GRAYSCALES

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Shuming Chang, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/561,216

(22) PCT Filed: Sep. 22, 2023

(86) PCT No.: PCT/CN2023/120574
§ 371 (c)(1),
(2) Date: Nov. 15, 2023

(87) PCT Pub. No.: WO2025/035540
PCT Pub. Date: Feb. 20, 2025

(65) Prior Publication Data

US 2025/0104595 A1 Mar. 27, 2025

(30) Foreign Application Priority Data

Aug. 14, 2023 (CN) ......................... 202311025377.8

(51) Int. Cl.
*G09G 3/20* (2006.01)

(52) U.S. Cl.
CPC ... *G09G 3/2074* (2013.01); *G09G 2320/0233* (2013.01); *G09G 2320/0242* (2013.01)

(58) Field of Classification Search
CPC ......... G09G 3/2074; G09G 2320/0233; G09G 2320/0242
See application file for complete search history.

(56) References Cited

U.S. PATENT DOCUMENTS

2018/0053462 A1* 2/2018 Bae ...................... G09G 3/2074
2024/0203314 A1* 6/2024 Hou ..................... G09G 3/3208

* cited by examiner

*Primary Examiner* — Ke Xiao
(74) *Attorney, Agent, or Firm* — PV IP PC; Wei Te Chung

(57) ABSTRACT

The present disclosure provides display panels and compensation methods thereof, and devices for generating compensation grayscales. The compensation method includes: obtaining a first compensation grayscale of first subpixels included in a first display portion and a second compensation grayscale of second subpixels included in a second display portion corresponding to a first original grayscale, where the first compensation grayscale and the second compensation grayscale are respectively determined by a second brightness of the second subpixels and a first brightness of the first subpixels under the first original grayscale; and controlling a first part of the first subpixels and a first part of the second subpixels to emit light under the first original grayscale, controlling a second part of the first subpixels and a second part of the second subpixels to emit light respectively under the first compensation grayscale and the second compensation grayscale.

20 Claims, 13 Drawing Sheets

DISPLAY PANELS, COMPENSATION METHODS THEREOF, DEVICES FOR GENERATING COMPENSATION GRAYSCALES

CROSS-REFERENCE TO RELATED APPLICATION

This application is a national stage of International Application No. PCT/CN2023/120574, filed on Sep. 22, 2023, which claims priority to Chinese Patent Application No. 202311025377.8, filed on Aug. 14, 2023. The aforementioned applications are herein incorporated by references in their entireties.

TECHNICAL FIELD

The present disclosure relates to the field of display technologies, and in particular, to manufacture of display devices, and specifically to display panels and compensation methods thereof, and devices for generating compensation grayscales.

BACKGROUND

At present, considering the costs of data driver chips, a display terminal may use a tri-gate drive architecture to reduce a number of data lines to ⅓ of a normal drive architecture, while a number of scanning lines is increased to 3 times of the normal drive architecture, so that a width of each gate pulse and charging time are also reduced to ⅓ of the normal drive architecture.

In the tri-gate drive architecture, on the one hand, due to the reduction in a number of data driver chips, a distance between two adjacent data driver chips is larger, resulting in a larger difference in the attenuation degree of electrical signals transmitted to the two adjacent data driver chips; on the other hand, as shown in FIG. 1, when a solid color image is displayed, an amplitude of a signal on the same data line (each of Da1, Da2, Da3, to Dan) is always in a state of high and low change, that is, it appears as a reloaded image. In addition, after each gate line (G1, G2, G3, to Gn) opens the corresponding row of pixels, the charging time of each row of pixels is insufficient, resulting in a more obvious brightness difference in the display areas controlled by the two adjacent data driver chips, which results in a stronger presence of a boundary between the display areas.

Therefore, the display image of the existing display terminal with the tri-gate drive architecture has a phenomenon of strong presence of the boundary, which needs to be improved urgently.

SUMMARY OF THE INVENTION

The purposes of the present disclosure are to provide display panels, compensation methods thereof, and devices for generating compensation grayscales, which improve the technical problem of the phenomenon of strong presence of the boundary in the display image of the existing display terminal with the tri-gate drive architecture.

The present disclosure provides a compensation method of a display panel, including:

dividing a display area of the display panel to at least a first display portion and a second display portion, wherein the first display portion comprises a plurality of first subpixels, the second display portion comprises a plurality of second subpixels, colors of the first subpixels and colors of the second subpixels are same;

obtaining a first compensation grayscale corresponding to a first original grayscale of the first subpixels, and obtaining a second compensation grayscale corresponding to a first original grayscale of the second subpixels, wherein the first compensation grayscale is determined at least by a second brightness of the second subpixels under the first original grayscale, and the second compensation grayscale is determined at least by a first brightness of the first subpixels under the first original grayscale; and controlling a first part of the first subpixels and a first part of the second subpixels to emit light under the first original grayscale, controlling a second part of the first subpixels to emit light under the first compensation grayscale, and controlling a second part of the second subpixels to emit light under the second compensation grayscale.

BENEFICIAL EFFECTS

The present disclosure provides display panels, compensation methods thereof, and devices for generating compensation grayscales. The first compensation grayscale corresponding to the first original grayscale of the first subpixel in the first display portion is obtained, and the compensation grayscale corresponding to the first original grayscale of the second subpixel in the second display portion is obtained, the color of the first subpixel and the color of the second subpixel are the same, the first compensation grayscale is determined at least by the second brightness of the second subpixel under the first original grayscale, and the second compensation grayscale is determined at least by the first brightness of the first subpixel under the first original grayscale; the first part of the first subpixels and the first part of the second subpixels are controlled to emit light under the first original grayscale, and the second part of the first subpixels are controlled to emit light under the first compensation grayscale, and the second part of the second subpixels are controlled to emit light under the second compensation grayscale. Thus, the brightness difference of the display images in different areas of the display panel are effectively reduced and the overall uniformity of the display images is improved.

DESCRIPTION OF DRAWINGS

The present disclosure will be further described below through the accompanying drawings. It should be noted that the drawings in the following description are only used to illustrate some embodiments of the present disclosure. For those skilled in the art, without exerting creative efforts, other drawings may also be obtained based on these accompanying drawings.

EMBODIMENTS OF THE INVENTION

The technical solutions in the embodiments of the present disclosure will be clearly and completely described below with reference to the accompanying drawings in the embodiments of the present disclosure. Obviously, the described embodiments are only some of the embodiments of the present disclosure, but not all of the embodiments. Based on the embodiments in the present disclosure, all other embodiments obtained by those skilled in the art without making creative efforts fall within the protection scope of the present disclosure.

In the description of the present disclosure, the terms “first”, “second”, etc. are used for descriptive purposes only and cannot be understood as indicating or implying relative importance or implicitly indicating the number of indicated technical features. Thus, features defined as “first” and “second” may explicitly or implicitly include one or more of the described features. In addition, it should be noted that the drawings only provide structures that are closely related to the application, and some details that are not closely related to the application are omitted. The purpose is to simplify the attached drawing and make the application points clear at a glance, rather than illustrating that the actual device is exactly the same as the attached drawing, and is not intended to be a limitation of the actual device.

Reference to “embodiment(s)” herein means that, in combination with specific features, structures, or characteristics described by the embodiments, may be included in at least one embodiment of the present disclosure. The appearance of this term at various times and positions in the specification does not necessarily refer to the same embodiment, nor is it a separate or alternative embodiment that is mutually exclusive with other embodiments. It is understood explicitly and implicitly by those skilled in the art that embodiments described herein may be combined with other embodiments.

The present disclosure provides compensation methods of a display panel, and the compensation method includes but is not limited to the following embodiments and combinations of the following embodiments.

Figure 2:
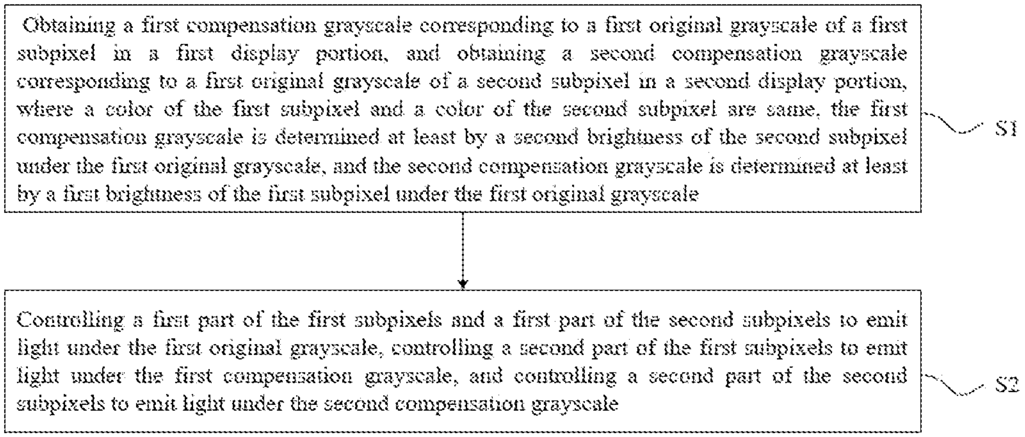
FIG. 2 is a flow chart of a compensation method of a display panel provided in embodiments of the present disclosure.

In an embodiment, as shown in FIG. 2, the compensation method of the display panel includes but is not limited to the following steps of S1 and S2.

The step S1 includes: obtaining a first compensation grayscale corresponding to a first original grayscale of a first subpixel in a first display portion, and obtaining a second compensation grayscale corresponding to a first original grayscale of a second subpixel in a second display portion, where a color of the first subpixel and a color of the second subpixel are same, the first compensation grayscale is determined at least by a second brightness of the second subpixel under the first original grayscale, and the second compensation grayscale is determined at least by a first brightness of the first subpixel under the first original grayscale.

Specifically, the display panel including the first display portion and the second display portion may be a self-luminous display panel or a liquid crystal display panel. The subpixel of the self-luminous display panel emits light driven by a driving current generated by a data voltage through a self-luminous element. A brightness of the subpixel is related to the current flowing through the self-luminous element and the duration of the current action. The subpixel of the liquid crystal display panel emits light when the light from a backlight passes through a liquid crystal layer, and a light transmittance of the liquid crystal layer is related to a voltage applied to both ends of the liquid crystal layer.

Before the step S1, the compensation method may also include, but is not limited to, the following step including: dividing a display area of the display panel to at least include the first display portion and the second display portion, where the first display portion includes a plurality of first subpixels, the second display portion includes a plurality of second subpixels, and the color of the first subpixel and the color of the second subpixel are the same.

The compensation method may include, but is not limited to, the following step before the step S1 including: obtaining a first mapping relationship between a brightness value and a grayscale value of the first subpixel, and obtaining a second mapping relationship between a brightness value and a grayscale value of the second subpixel. Furthermore, the first brightness, the second brightness, the first compensation grayscale, and the second compensation grayscale are determined according to the first mapping relationship and the second mapping relationship.

Figure 3:
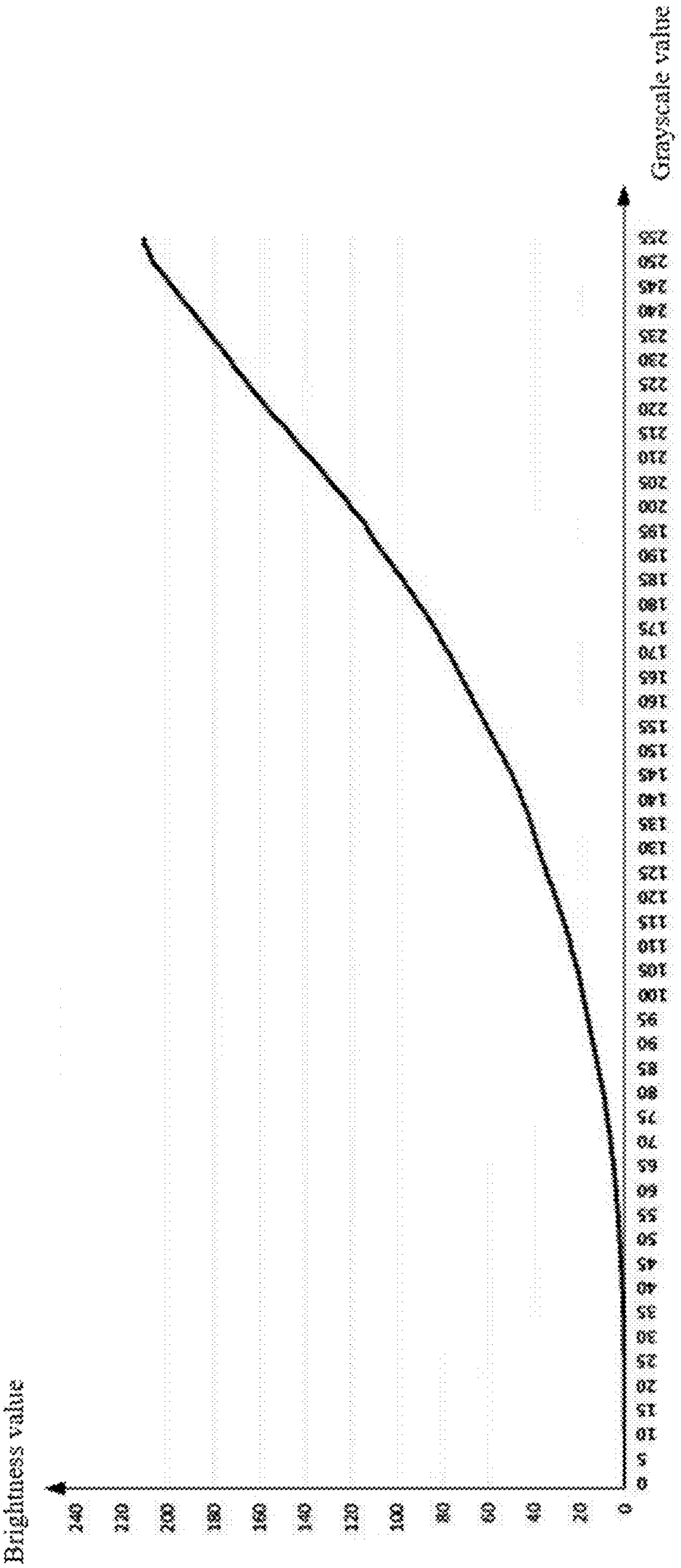
FIG. 3 is a gamma curve diagram of a subpixel of a display panel provided in embodiments of the present disclosure.

Specifically, each subpixel of the display panel may have a corresponding a gamma mapping relationship (which may include, but is not limited to, a gamma curve or a gamma table). Here, the gamma mapping relationship is taken as the gamma curve as an example. Note that further, on a condition that the differences between different areas of the display panel are not considered, it can be considered that the subpixels having the same color correspond to the same gamma curve. Specifically, as illustrated in FIG. 3, the abscissa of the gamma curve represents the grayscale value corresponding to the data voltage acting on a subpixel, where the grayscale value and the data voltage can be considered to correspond one to one; the ordinate of the gamma curve represents the brightness value of the subpixel that emits light under the action of the voltage value. It can be considered that the relationship between the brightness value and the grayscale value in different gamma curves is different. In particular, considering the differences between different areas of the display panel, in the embodiments, the first subpixel in the first display portion and the second subpixel in the second display portion may have a first gamma curve (included in the first mapping relationship)

and a second gamma curve (included in the second mapping relationship), respectively, as respective gamma curves, even if they have the same color.

Specifically, the first brightness in the step S1 of the embodiments may be a brightness value corresponding to a grayscale value in the first gamma curve equal to the first original grayscale. Similarly, the second brightness may be a brightness value corresponding to a grayscale value in the second gamma curve equal to the first original grayscale. The first brightness is not equal to the second brightness, and the difference between the two represents a brightness difference between the subpixels (i.e., the first subpixel and the second subpixel) having the same color (e.g., green) under the grayscale values equal to the first original grayscale. It should be noted that when the above-mentioned brightness difference exists, light emitted by the subpixels having the same color (such as green) in the first display portion and the second display portion under the same data voltage may have different brightness, which results in an uneven display of the images.

As discussed above, in the embodiments, based on the first gamma curve, the first compensation grayscale may be determined at least by a grayscale value corresponding to the data voltage applied to the first subpixel when emitting light with the second brightness. Similarly, based on the second gamma curve, the second compensation grayscale may be determined at least by a grayscale value corresponding to the data voltage applied to the second subpixel when emitting light with the first brightness. Thus, it can be considered that the first compensation grayscale takes into account the difference between the first gamma curve of the first subpixel and the second gamma curve of the second subpixel under the first original grayscale, and the second compensation grayscale also takes into account the difference between the second gamma curve of the second subpixel and the first gamma curve of the first subpixel under the first original grayscale.

The step S2 includes: controlling a first part of the first subpixels and a first part of the second subpixels to emit light under the first original grayscale, controlling a second part of the first subpixels to emit light under the first compensation grayscale, and controlling a second part of the second subpixels to emit light under the second compensation grayscale.

Specifically, based on the above discussion, the embodiments may be presented as: in the first display portion, the first part of the first subpixels emit light under the first original grayscale to have the first brightness, and the second part of the first subpixels emit light under the first compensation grayscale to have a brightness (first compensation brightness) limited by the second brightness; in the second display portion, the first part of the second subpixels emit light under the second original grayscale to have the second brightness, and the second part of the second subpixels emit light under the second compensation grayscale to have a brightness (second compensation brightness) limited by the first brightness.

It can be understood that a brightness finally presented in the first display portion is composed of the first brightness of multiple areas and the first compensation brightness (limited by the second brightness) in multiple areas. Compared with being composed entirely of the first brightness, it may be closer to an entire brightness in the second display portion composed of the second brightness, so as to reduce the difference between the display image in the first display portion and the display image in the second display portion. Furthermore, a brightness finally presented in the second display portion is composed of the second brightness of multiple areas and the second compensation brightness (limited by the first brightness) in multiple areas. Compared with being composed entirely of the second brightness, it can be closer to an entire brightness of the first display portion composed of the first brightness, so as to similarly reduce the difference between the display image in the second display portion and the display image in the first display portion. Therefore, the embodiments may effectively reduce the brightness difference between the display images in different areas of the display panel and improve an overall uniformity of the display images.

In particular, the first compensation grayscale refers to the grayscale value of the first subpixel corresponding to the second brightness, and the second compensation grayscale refers to the grayscale value of the second subpixel corresponding to the first brightness. Specifically, the grayscale value corresponding to the data voltage applied to the first subpixel when emitting light with the second brightness is obtained according to the first gamma curve as the first compensation grayscale. Similarly, the grayscale value corresponding to the data voltage applied to the second subpixel when emitting light with the first brightness is obtained according to the second gamma curve as the second compensation grayscale. That is, it can be considered that: the brightness finally presented in the first display portion is composed of the first brightness of multiple areas and the second brightness of multiple areas, and the brightness finally presented in the second display portion is composed of the second brightness of multiple areas and the first brightness of multiple areas. Therefore, the brightness finally presented by the two display portions are both composed of two elements of the first brightness and the second brightness, and the entire brightness may be close due to the same constituent elements.

Furthermore, a number of first subpixels in the first part of the first subpixels is equal to a number of second subpixels in the second part of the second subpixels, and a number of first subpixels in the second part of the first subpixels is equal to a number of second subpixels in the first part of the second subpixels. As discussed above, it can be considered that a number of the first subpixels having the first brightness in the first display portion is the same as a number of the second subpixels having the second compensation brightness (for example, equal to the first brightness) in the second display portion, and a number of the first subpixels having the first compensation brightness (for example, equal to the second brightness) in the first display portion is equal to a number of the second subpixels having the second brightness in the second display portion. That is, the numbers of the subpixels having the first brightness in the two display portions are the same, the numbers of the subpixels having the second brightness in the two display portions may also be the same, so that the brightness finally presented by the two display portions may be further equal.

Figure 4:
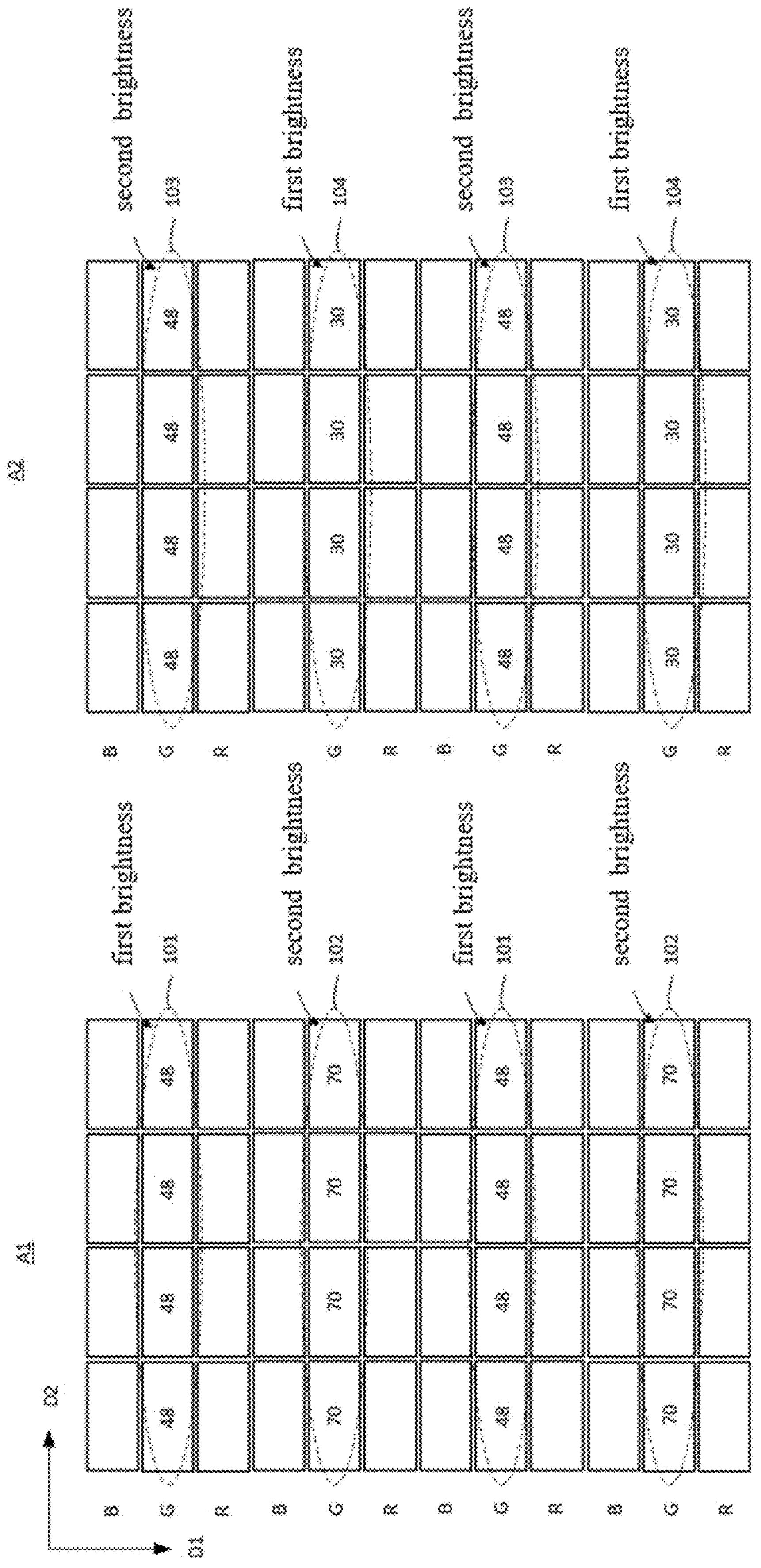
FIG. 4 is a schematic diagram of subpixels and light emission of both a first display portion and a second display portion of a display panel provided in embodiments of the present disclosure.

As illustrated in FIG. 4, in the first display portion A1, the first part of first subpixels include a plurality of first subpixel groups 101, the second part of first subpixels include a plurality of second subpixel groups 102, and the plurality of first subpixel groups 101 and the plurality of second subpixel groups 102 are alternately arranged along a first direction D1. In the second display portion A2, the first part of second subpixels include a plurality of third subpixel groups 103, the second part of second subpixels include a plurality of fourth subpixel groups 104, and the plurality of third subpixel group 103 and the plurality of fourth subpixel groups 104 are alternately arranged along the first direction.

Figure 1:
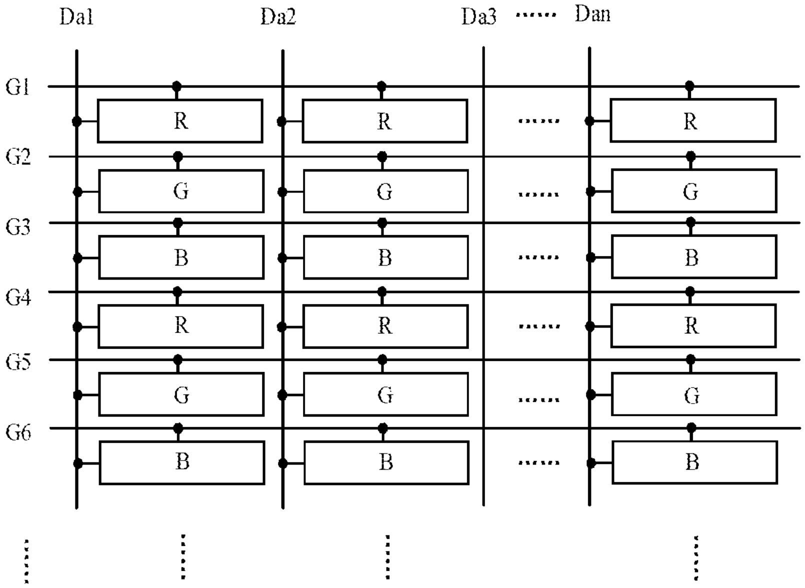
FIG. 1 is a schematic connection diagram of pixels, gate lines, and data lines of a display panel with a tri-gate drive architecture provided in embodiments of the present disclosure.

Specifically, combined with FIG. 1, a tri-gate drive architecture is taken as an example for explanation, that is, the subpixels in a same row may have the same color, and the subpixels in two adjacent rows may have different colors. For example, in the first direction D1 (column direction), one row of blue subpixels B, one row of green subpixels G, and one row of red subpixels R may be defined as a minimum repeating unit, and the subpixels may be arranged repeatedly in sequence. In the second direction D2 (row direction), multiple columns of subpixels may be arranged, and the subpixels in each column may be arranged repeatedly with one blue subpixel B, one green subpixel G, and one red subpixel R as another minimum repeating unit.

Taking the first subpixel and the second subpixel both as green subpixels G as an example, in the embodiments, the first subpixel groups 101 and the second subpixel groups 102 may be the green subpixels G located in odd-numbered rows (such as rows 1 and 3 in the first display portion A1) and the green subpixels G located in even-numbered rows (such as rows 2 and 4 in the first display portion A1) of the multiple rows of first subpixels (green subpixels G); and similarly, the third subpixel groups 103 and the fourth subpixel groups 104 may be the green subpixels G located in odd-numbered rows (such as rows 1 and 3 in the second display portion A2) and the green subpixels G located in even-numbered rows (such as rows 2 and 4 in the second display portion A2) of the multiple rows of second subpixels (green subpixels G).

Specifically, as illustrated in FIG. 4, that the first original grayscale is equal to 48 is taken as an example. If only when the grayscale value is equal to 70 can the brightness of the first subpixel in the first display portion A1 be consistent with the brightness of the second subpixel in the second display portion A2 under the first original grayscale (equal to 48) are consistent, then the first compensation grayscale is equal to 70. Similarly, If only when the grayscale value is equal to 30 can the brightness of the second subpixel in the second display portion A2 be consistent with the brightness of the first subpixel in the first display portion A1 under the first original grayscale (equal to 48) are consistent, then the second compensation grayscale is equal to 30.

It can be understood that the first subpixels having the first brightness and the second brightness in the first display portion A1 can be evenly distributed in this way, and the second subpixels having the first brightness and the second brightness in the second display portion A2 can also be evenly distributed, which may improve the uniformity of brightness in a smaller display area. Of course, the subpixels having the first brightness and the second brightness in the two display portions may also be evenly distributed in other arrangements, such as alternately distributed in the row direction, or alternately distributed in both the row direction and the column direction.

Figure 5:
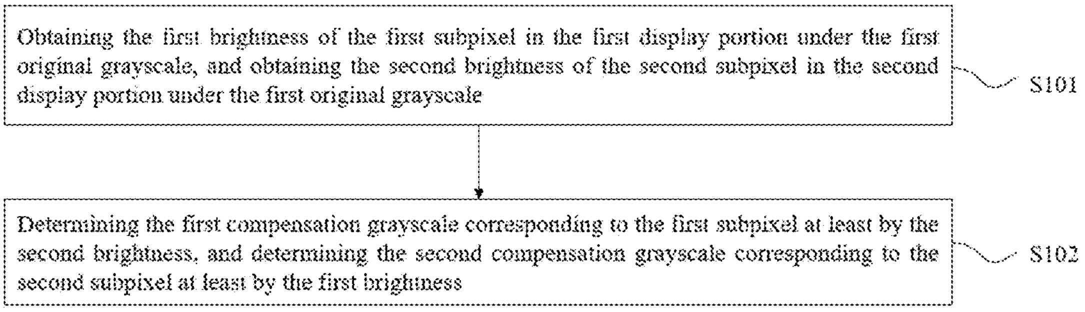
FIG. 5 is another flow chart of a compensation method of a display panel provided in embodiments of the present disclosure.

Specifically, in conjunction with the above discussion, that is, as shown in FIG. 5, the step S1 may include, but is not limited to, the following steps of S101 and S102.

The step S101 includes: obtaining the first brightness of the first subpixel in the first display portion under the first original grayscale, and obtaining the second brightness of the second subpixel in the second display portion under the first original grayscale.

As discussed above, the first brightness and the second brightness may be determined according to the first gamma curve and the second gamma curve, respectively.

The step S102 includes: determining the first compensation grayscale corresponding to the first subpixel at least by the second brightness, and determining the second compensation grayscale corresponding to the second subpixel at least by the first brightness.

As discussed above, the first compensation grayscale and the second compensation grayscale may also be determined according to the first gamma curve and the second gamma curve, respectively.

It should be noted that, in case 1, an execution subject of the step S2 and an execution subject of steps S101 to S102 may respectively be the display panel itself and a non-panel device (such as a compensation grayscale generation device), i.e., it can be considered that: before the panel is delivered, it may be debugged by the compensation grayscale generating device through, but not limited to, the steps S101 and S102 to determine the first compensation grayscale corresponding to the first original grayscale of the first subpixel and the second compensation grayscale corresponding to the first original grayscale of the second subpixel, and the first compensation grayscale and the second compensation grayscale are stored in the display panel; and after the panel is delivered, the above compensation grayscales may be invoked according to the needs during the image display process to perform the step S2 (executed by the display panel). And in another case 2, the execution subject of step S2 and the execution subject of steps S101 to S102 may both be the display panel itself, that is, the first compensation grayscale and the second compensation grayscale can be determined and directly invoked before or after the display panel is delivered.

Figure 6:
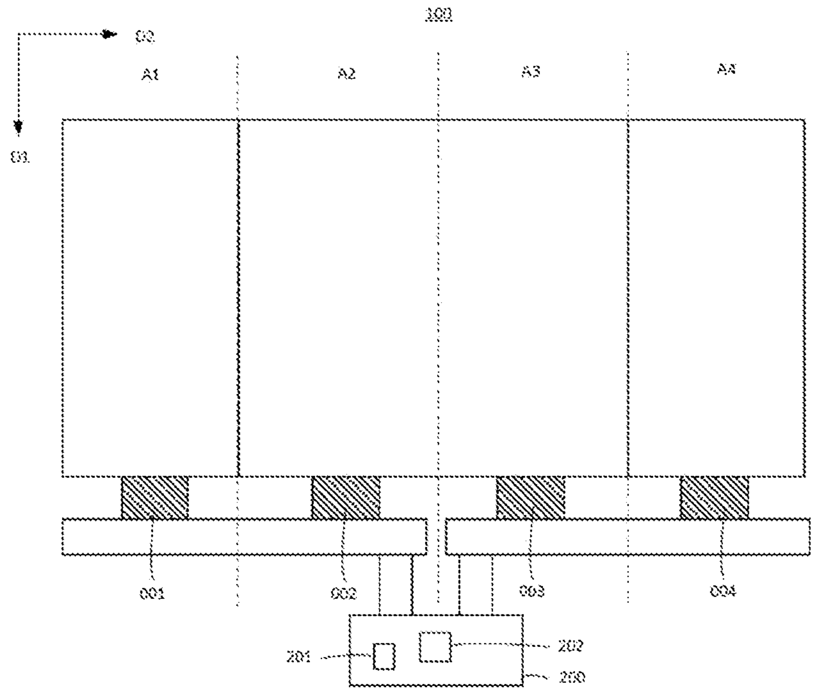
FIGS. 6 to 8 are schematic connection diagrams of multiple components of the display panel provided in embodiments of the present disclosure.
Figure 7:
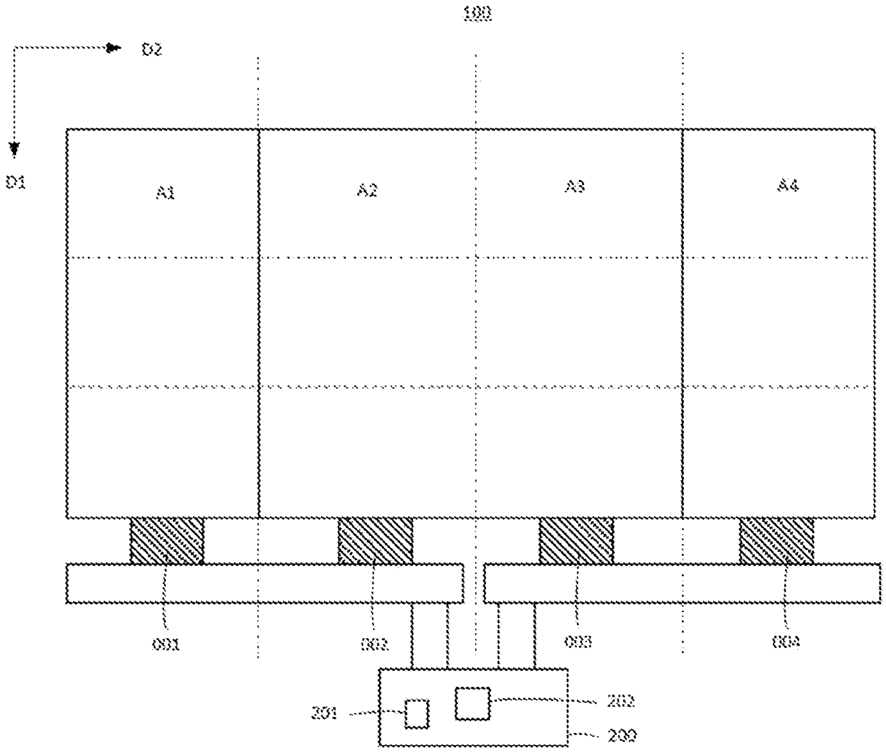
Figure 8:
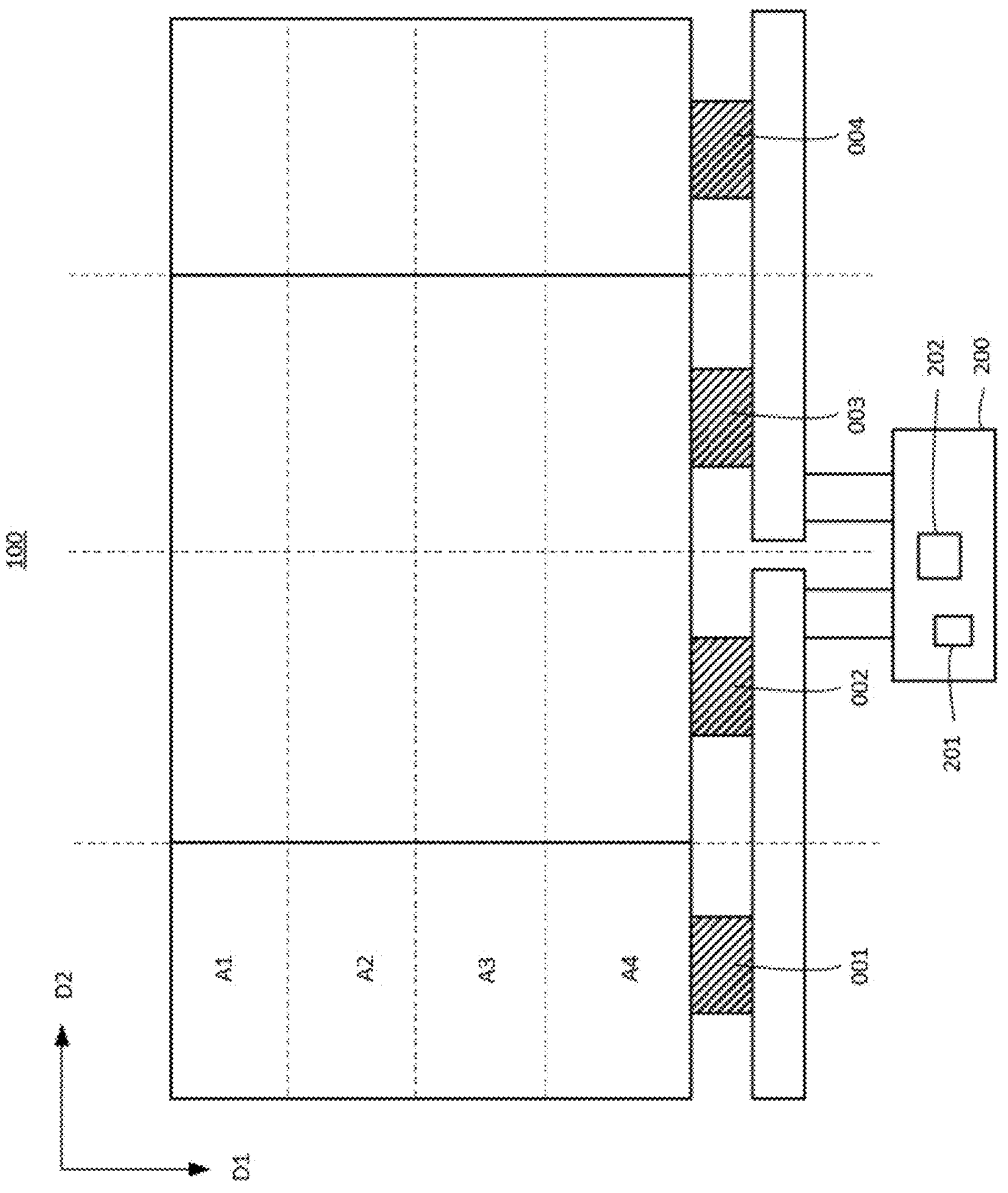

In some embodiments, as illustrated in FIGS. 6 to 8, the display panel 100 includes a first source driver chip 001 and a second source driver chip 002. As illustrated in FIGS. 6 and 7, the first display portion A1 and the second display portion A2 are electrically connected to the first source driving chip 001 and the second source driving chip 002, respectively; or, as illustrated in FIG. 8, the first display portion A1 and the second display portion A2 are both electrically connected to the first source driver chip 001, and the resistances between them and the first source driver chip 001 are different.

Specifically, the display panel 100 may also include a motherboard 200 electrically connected to a plurality of source driver chips (including, but not limited to, the first source driver chip 001 and the second source driver chip 002). The motherboard may include, but is not limited to, a power management module 201 and a timing control module 202. The power management module 201 is configured to transmit a gamma voltage to each source driver chip, and transmit a corresponding image signal and a corresponding working voltage to the timing control module 202. The timing control module 202 is configured to convert the image signal to a corresponding original data signal transmitted to each source driver chip under the driving voltage, and each source driver chip can generate a data signal loaded to the corresponding subpixels according to the gamma voltage and the corresponding original data signal.

It should be noted that, on the one hand, due to differences in transmission distances between the power management module 201 and different source driver chips, the display images may be uneven. For example, on a condition that the power management module 201 is placed close to the middle of the display panel 100, it can be considered that the gamma voltage first passes through the second source driver chip 002, and then passes through the first source driver chip 001, by taking into account the influence of the resistance of the components, the data voltage acting on the first display portion A1 electrically connected to the first source driver chip 001 is less than the data voltage acting on the second display portion A2 electrically connected to the second source driver chip 002, which may result in the uneven display of the images. On the other hand, even for the first display portion A1 and the second display portion A2 that are both electrically connected to the first source driving chip 001, due to the difference in transmission distance between the first source driving chip 001 and the two display portions, the resistances between the two display portions and the first source driver chip 001 are different, which may also result in the uneven display of the images.

It can be understood that in the embodiments, the first display portion A1 and the second display portion A2 in the above two scenarios are arranged as above, which may improve the uneven display of the images caused by at least one of the above two reasons. Furthermore, as illustrated in FIGS. 6 and 7, when the display panel 100 is further divided into a fourth display portion A4 and a third display portion A3 that are respectively symmetrical with the first display portion A1 and the second display portion A2, it can be considered that a transmission distance between the power management module 201 and the second display portion A2 and a transmission distance between the power management module 201 and the third display portion A3 are equivalent, and it can be considered that there is almost no "boundary line" between the display images of the two, and thus the above method for improving the "boundary line" between the first display portion A1 and the second display portion A2 to improve a "boundary line" between the third display portion A3 and the fourth display portion A4. Similarly, as illustrated in FIG. 8, when the display panel 100 is further divided into the fourth display portion A4 and the third display portion A3 that are respectively symmetrical with the first display portion A1 and the second display portion A2 in the first direction D1, the above method may also be used to improve the "boundary line" between the third display portion A3 and the fourth display portion A4.

Figure 9:
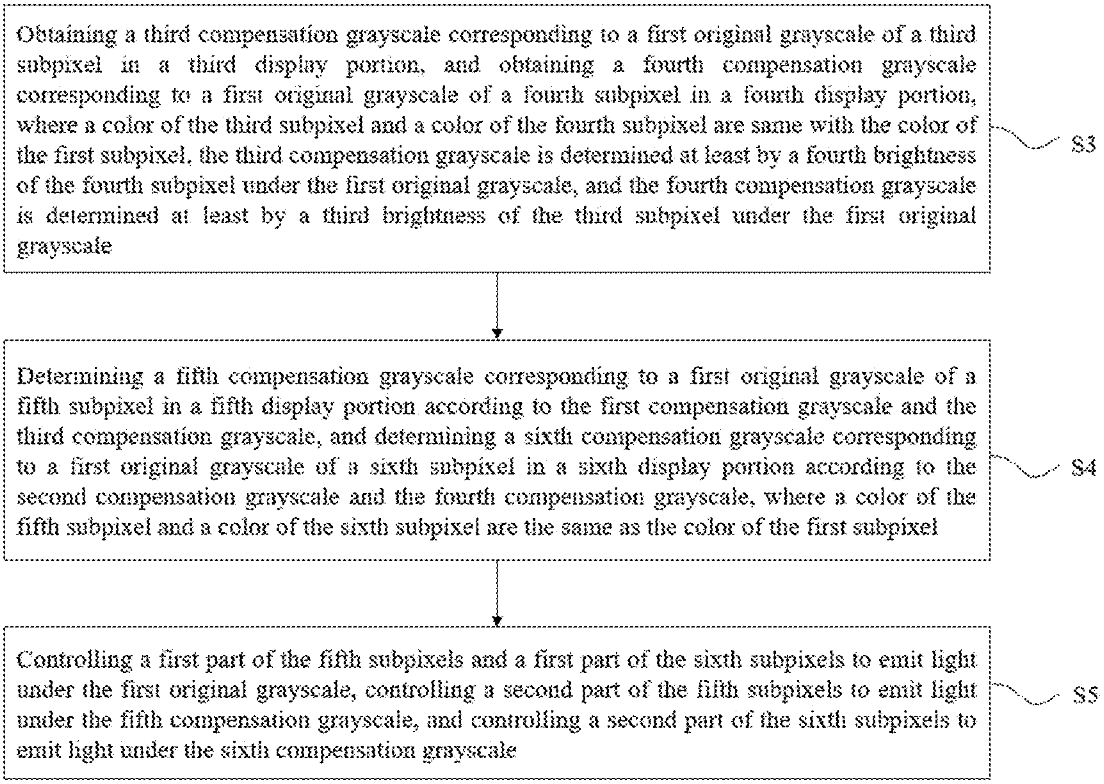
FIG. 9 is another flow chart of a compensation method of a display panel provided in embodiments of the present disclosure.

In an embodiment, as shown in FIG. 9, the method may also include, but is not limited to, the following steps of S3, S4, and S5, and combinations of the following steps.

The step S3 includes: obtaining a third compensation grayscale corresponding to a first original grayscale of a third subpixel in a third display portion, and obtaining a fourth compensation grayscale corresponding to a first original grayscale of a fourth subpixel in a fourth display portion, where a color of the third subpixel and a color of the fourth subpixel are same with the color of the first subpixel, the third compensation grayscale is determined at least by a fourth brightness of the fourth subpixel under the first original grayscale, and the fourth compensation grayscale is determined at least by a third brightness of the third subpixel under the first original grayscale.

Similarly, before the step S3, the compensation method may also include, but is not limited to, the following step including: dividing the display area of the display panel to at least further include the third display portion and the fourth display portion, where the third display portion includes a plurality of third subpixels, the fourth display portion includes a plurality of fourth subpixels, and the color of the third subpixel and the color of the fourth subpixel are the same with the color of the first subpixel.

Specifically, the third display portion, the third subpixels, the fourth display portion, and the fourth subpixels in the embodiments may refer to the relevant description of the above-mentioned first display portion, first subpixels, second display portion, and second display portions, respectively. A description of obtaining the third compensation grayscale and the fourth compensation grayscale in the embodiments may refer to the description of obtaining the first compensation grayscale and the second compensation grayscale in the above step S1.

The step S4 includes: determining a fifth compensation grayscale corresponding to a first original grayscale of a fifth subpixel in a fifth display portion according to the first compensation grayscale and the third compensation grayscale, and determining a sixth compensation grayscale corresponding to a first original grayscale of a sixth subpixel in a sixth display portion according to the second compensation grayscale and the fourth compensation grayscale, where a color of the fifth subpixel and a color of the sixth subpixel are the same as the color of the first subpixel.

Similarly, before the step S4, the compensation method may also include, but is not limited to, the following step including: dividing the display area of the display panel to at least further include the fifth display portion and the sixth display portion, where the fifth display portion includes a plurality of fifth subpixels, the sixth display portion includes a plurality of sixth subpixels, and the color of the fifth subpixel and the color of the sixth subpixel are the same with the color of the first subpixel.

Figure 10:
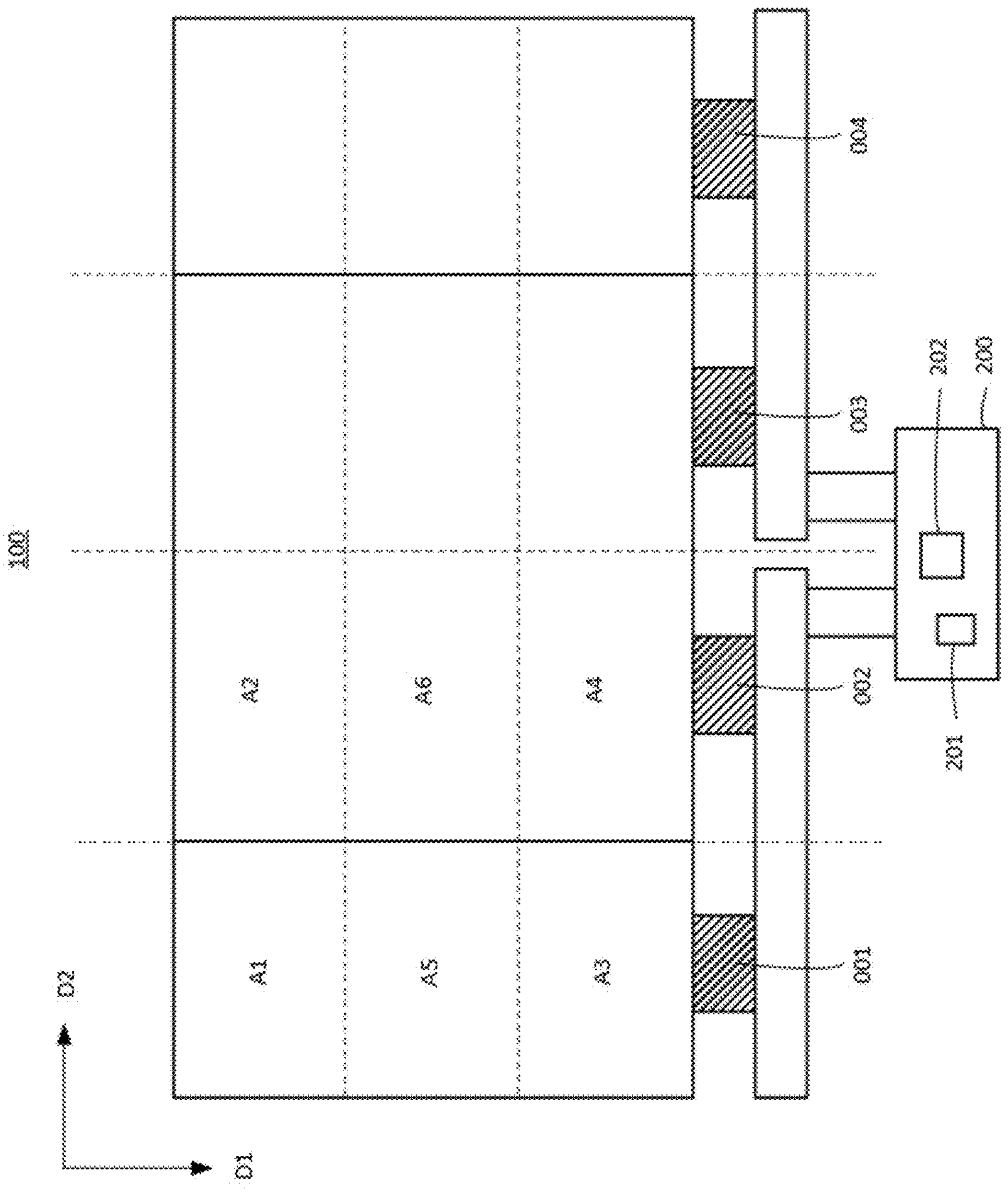
FIGS. 10 to 11 are another schematic connection diagrams of multiple components of the display panel provided in embodiments of the present disclosure.

As illustrated in FIG. 10, the first display portion A1, the third display portion, and the fifth display portion A5 are all electrically connected to the first source driver chip 001, and there are a first resistance, a third resistance, and a fifth resistance respectively between the three and the first source driver chip 001. The second display portion A2, the fourth display portion A4, and the sixth display portion A6 are all electrically connected to the second source driver chip 002, and there are a second resistance, a fourth resistance, and a sixth resistance respectively between the three and the second source driver chip 002. The first resistance is equal to the second resistance, the third resistance is equal to the fourth resistance, and the fifth resistance is equal to the sixth resistance. According to the connection structure illustrated in FIG. 10, it can be considered that the first display portion A1, the third display portion A3, and the fifth display portion A5 are arranged in a same column (relative positions of the three are not limited), and the second display portion A2, the fourth display portion A4, and the sixth display portion A6 are arranged in a same column (relative positions of the three are same as the previous three). The first display portion A1 and the second display portion A2 are arranged in a same row, the fifth display portion A5 and the sixth display portion A6 are arranged in a same row, and the third display portion A3 and the fourth display portion A4 are arranged in a same row.

Figure 11:
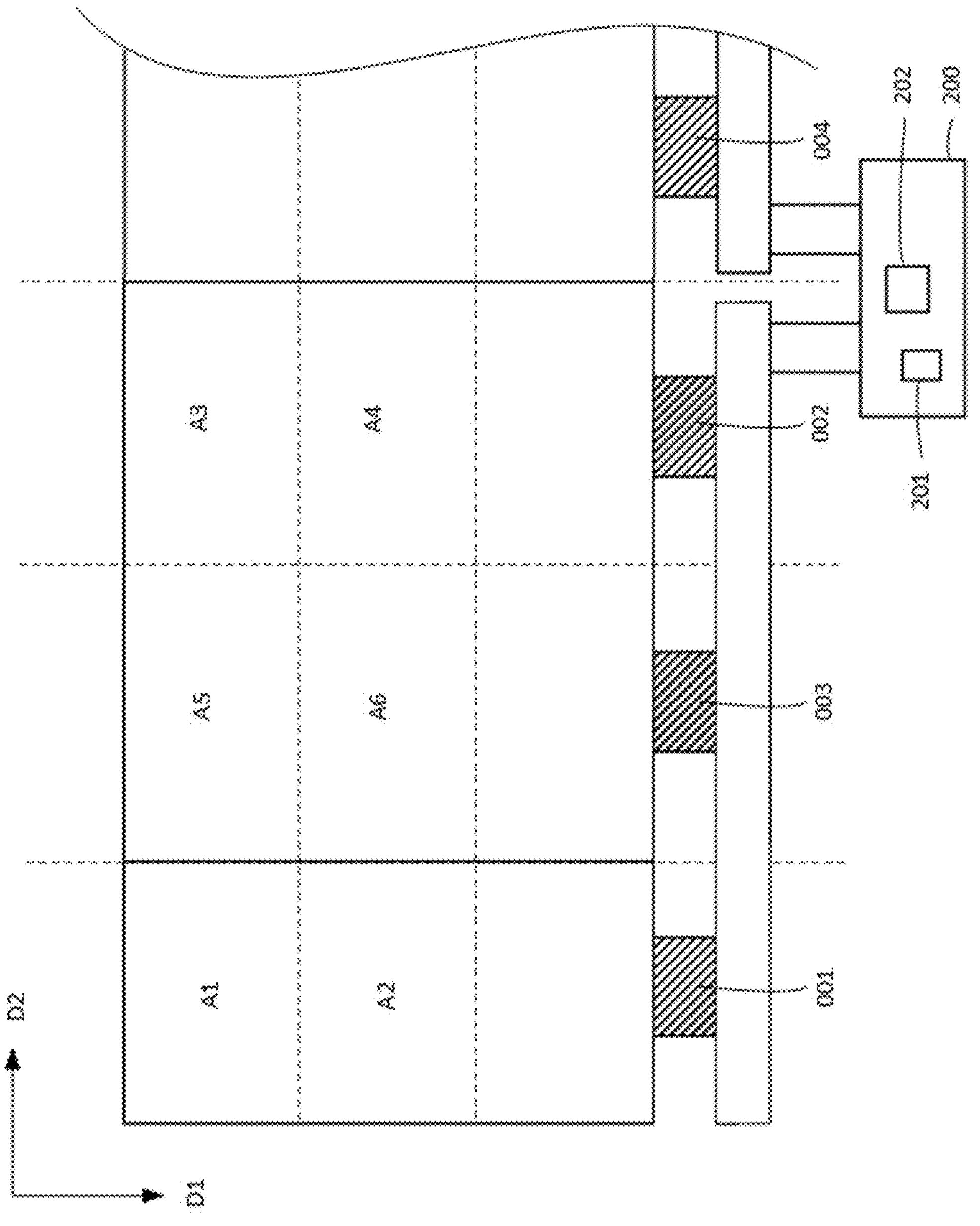

Or, as illustrated in FIG. 11, the first display portion A1 and the second display portion A2 are both electrically connected to the first source driver chip 001, and there are a first resistance and a second resistance respectively between the two and the first source driver chip 001; the third display portion A3 and the fourth display portion A4 are both electrically connected to the second source driver chip 002, and there are a third resistance and a fourth resistance respectively between the two and the second source driver chip 002. The fifth display portion A5 and the sixth display portion A6 are both electrically connected to a third source driver chip 003, and there are a fifth resistance and a sixth resistor respectively between the two and the third source driver chip 003. The first resistance, the third resistance, and the fifth resistance are equal, and the second resistance, the fourth resistance, and the sixth resistance are equal. According to the connection structure illustrated in FIG. 11, it can be considered that the first display portion A1, the third display portion A3 and the fifth display portion A5 are arranged in a same row (relative positions of the three are not limit), and the second display portion A2, the fourth display portion A4, and the sixth display portion A6 are arranged in a same row (relative positions of the three are same as the previous three). The first display portion A1 and the second display portion A2 are arranged in a same column, the fifth display portion A5 and the sixth display portion A6 are arranged in a same column, and the third display portion A3 and the fourth display portion A4 are arranged in a same column.

Specifically, a value of the resistance mentioned in the embodiments may be equivalent to describing a length of a transmission path between the subpixel and the corresponding source driver chip. The embodiments may determine the fifth compensation grayscale and the sixth compensation grayscale by, but not limited to, linear interpolation. For example, the fifth compensation grayscale corresponding to the fifth subpixel may be determined according to a difference between the first compensation grayscale and the third compensation grayscale and the relative positions of the fifth subpixel, the first subpixel, and the third subpixel, and the sixth compensation grayscale may be determined in the same way.

The step S5 includes: controlling a first part of the fifth subpixels and a first part of the sixth subpixels to emit light under the first original grayscale, controlling a second part of the fifth subpixels to emit light under the fifth compensation grayscale, and controlling a second part of the sixth subpixels to emit light under the sixth compensation grayscale.

Similarly, the step S2 can be referred to control luminous modes of the third subpixels in the third display portion A3 and the fourth subpixels in the fourth display portion A4, and luminous modes of the fifth subpixels in the fifth display portion A5 and the sixth subpixels in the sixth display portion A6 are also controlled as correspondingly in the step S2.

Similarly, in the embodiments, the difference between the display image in the third display portion A3 and the display image in the fourth display portion A4 may be reduced, and the difference between the display image in the fifth display portion A5 and the display image in the sixth display portion A6 may be reduced. Therefore, the embodiments may further effectively reduce the brightness difference of the display images in different areas of the display panel, and improve the overall uniformity of the display images.

Figure 12:
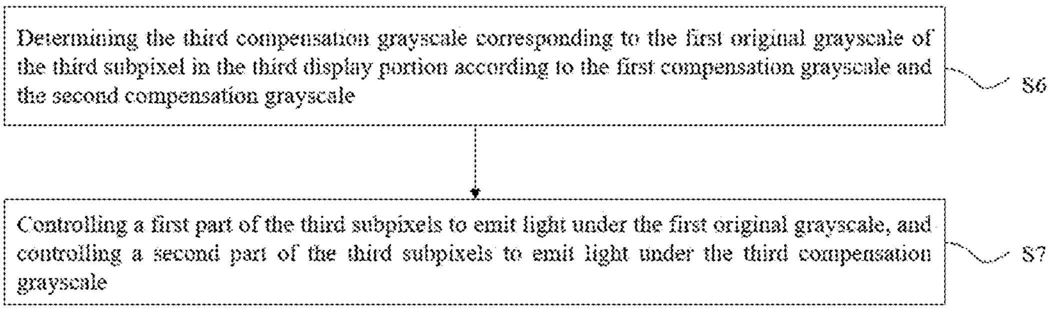
FIG. 12 is another flow chart of a compensation method of a display panel provided in embodiments of the present disclosure.

In an embodiment, as shown in FIG. 12, the method may also include, but is not limited to, the following steps of S6 and S7, and combinations of the following steps.

The step S6 includes: determining the third compensation grayscale corresponding to the first original grayscale of the third subpixel in the third display portion according to the first compensation grayscale and the second compensation grayscale.

Figure 13:
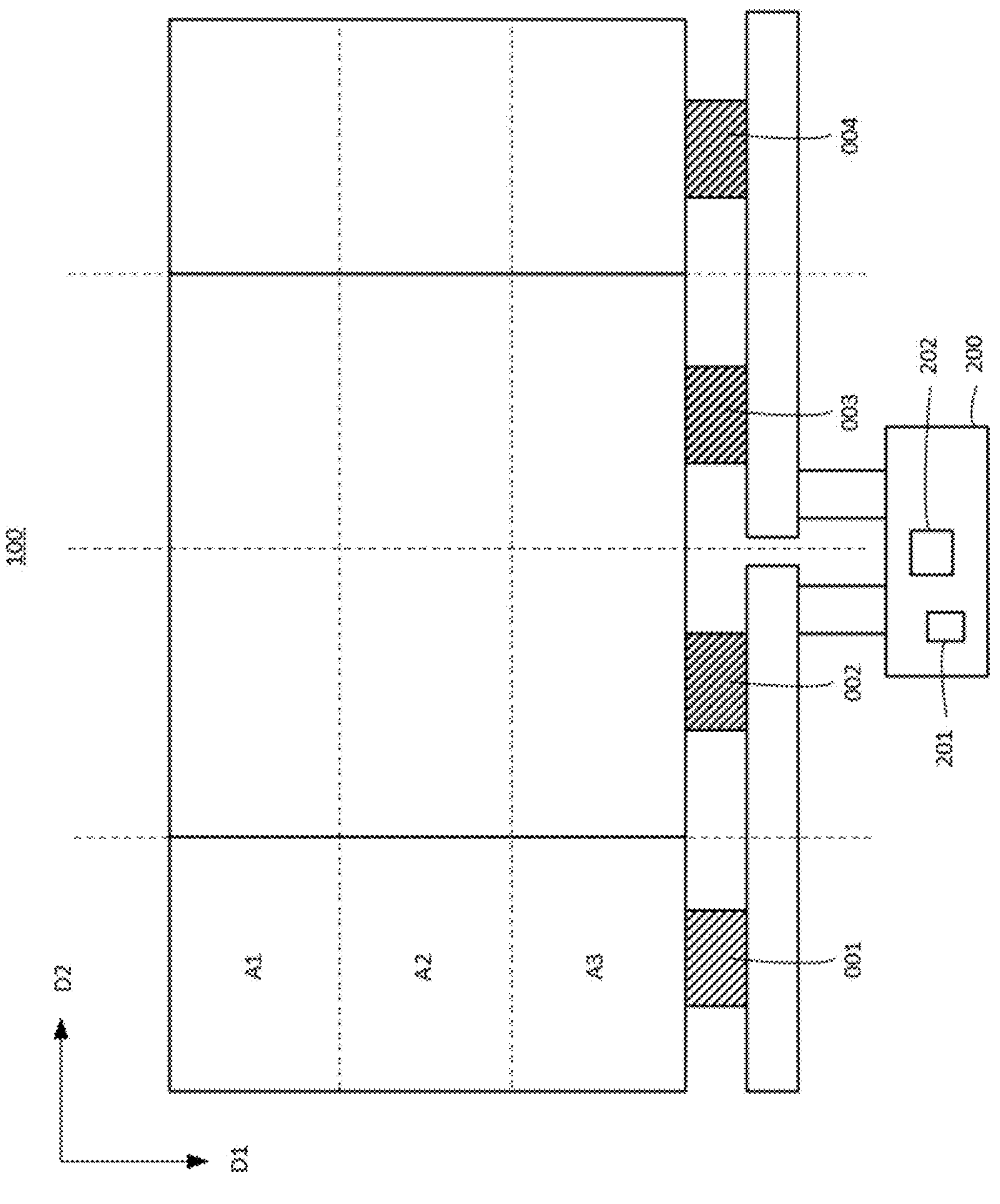
FIGS. 13 to 14 are another schematic connection diagrams of multiple components of the display panel provided in embodiments of the present disclosure.

As illustrated in FIG. 13, the first display portion A1, the second display portion A2, and the third display portion A3 are all electrically connected to the first source driver chip 001. According to the connection structure illustrated in FIG. 13, it can be considered that the first display portion A1, the second display portion A2, and the third display portion A3 are arranged in a same column.

Figure 14:
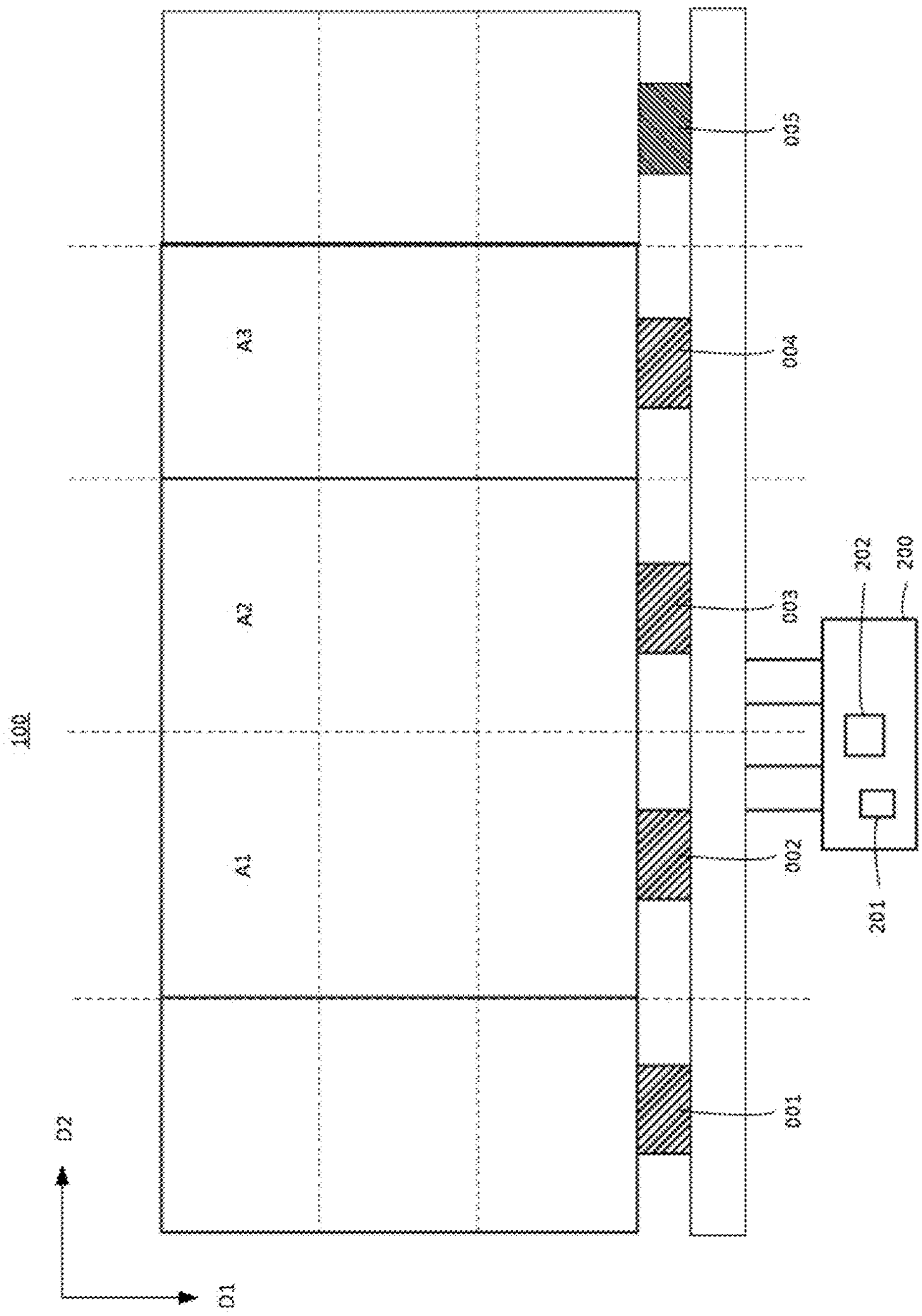

Or, as illustrated in FIG. 14, the first display portion A1, the second display portion A2, and the third display portion A3 are electrically connected to the second source driver chip 002, the third source driver chip 003, and a fourth source driver chip 004 (taking that the first source driver chip 001 to the fourth source driver chip 004 are provided as an example), respectively. The resistances between the first display portion A1 and the second source driver chip 002, between the second display portion A2 and the third source driver chip 003, and between the third display portion A3 and the fourth source driver chip 004 are the same (since the second source driver chip 002 to the fourth source driver chip 004 are arranged close to the center of the display panel 100, the distance between any two of the second source driver chip 002, third source driver chip 003, and fourth source driver chip 004 in a horizontal direction can be ignored here). According to the connection structure illustrated in FIG. 14, it can be considered that the first display portion A1, the second display portion A2, and the third display portion A3 are arranged in a same row.

Specifically, as discussed above, the first compensation grayscale is determined at least by the second brightness of the second subpixel under the first original grayscale, and the second compensation grayscale is determined at least by the first brightness of the first subpixel under the first original grayscale, and furthermore, it can be considered that the brightness of the first subpixel under the first compensation grayscale is equal to the second brightness, and the brightness of the second subpixel under the second compensation grayscale is equal to the first brightness. Similarly, the third compensation grayscale may be determined by, but not limited to, linear interpolation. For example, the third grayscale compensation corresponding to the third subpixel may be determined according to the difference between the first compensation grayscale and the second compensation grayscale and the relative positions of the third subpixel, the first subpixel, and the second subpixel.

The step S7 includes: controlling a first part of the third subpixels to emit light under the first original grayscale, and controlling a second part of the third subpixels to emit light under the third compensation grayscale.

It is understandable that, combined with the above discussion, the entire brightness in both the first display portion A1 and the second display portion A2 is composed of the first brightness of multiple areas and the second brightness multiple areas, and an entire brightness of all subpixels having the color may be a certain brightness value between the first brightness and the second brightness. The first brightness and the second brightness may be the same. It can be considered that, in the embodiments, the third subpixels emitting light under the first original grayscale and the third compensation grayscale have the third brightness and the fourth brightness. For example, when the third display portion A3 is located between the first display portion A1 and the second display portion A2, it can be considered that the third compensation grayscale is between the first compensation grayscale and the second compensation grayscale, and the third brightness and the fourth brightness (the two may be equal) are both between the first brightness and the second brightness, and an entire brightness of the third display portion A3 may be close to the entire brightness of the first display portion A1 and the entire brightness of the second display portion A2.

Figure 15:
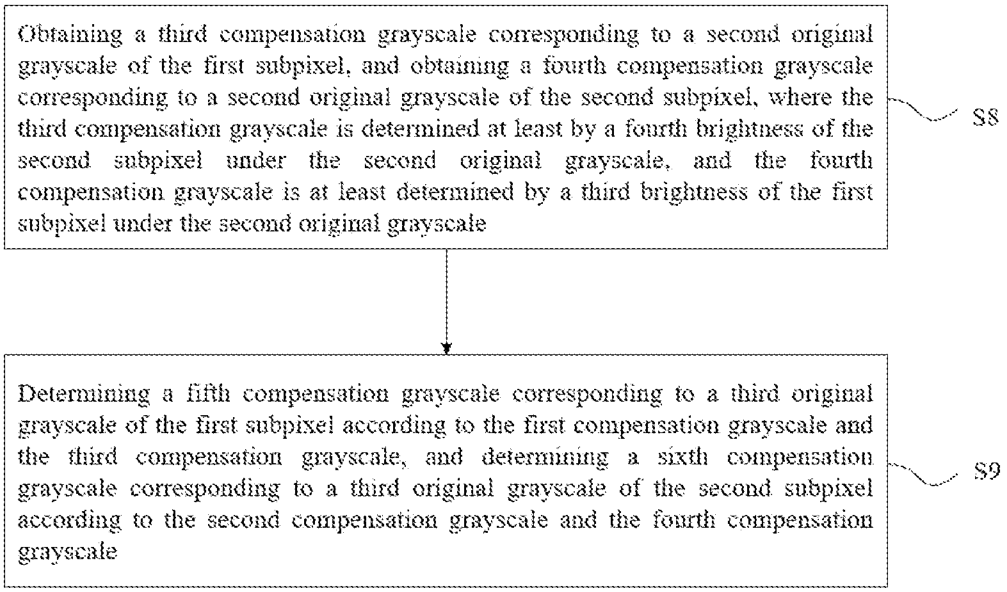
FIG. 15 is another flow chart of a compensation method of a display panel provided in embodiments of the present disclosure.

In an embodiment, as shown in FIG. 15, the method may also include, but is not limited to, the following steps of S8 and S9, and combinations of the following steps.

The step S8 includes: obtaining a third compensation grayscale corresponding to a second original grayscale of the first subpixel, and obtaining a fourth compensation grayscale corresponding to a second original grayscale of the second subpixel, where the third compensation grayscale is determined at least by a fourth brightness of the second subpixel under the second original grayscale, and the fourth compensation grayscale is at least determined by a third brightness of the first subpixel under the second original grayscale.

The second original grayscale may not be equal to the first original grayscale. Similarly, with reference to the discussion of the step S1, the embodiment can obtain the third compensation grayscale of the first subpixel and the fourth compensation grayscale of the second subpixel corresponding to the second original grayscale.

The step S9 includes: determining a fifth compensation grayscale corresponding to a third original grayscale of the first subpixel according to the first compensation grayscale and the third compensation grayscale, and determining a sixth compensation grayscale corresponding to a third original grayscale of the second subpixel according to the second compensation grayscale and the fourth compensation grayscale.

The third original grayscale may not be equal to the first original grayscale and the second original grayscale. Similarly, this embodiment may determine the fifth compensation grayscale and the sixth compensation grayscale by, but not limited to, linear interpolation. For example, the fifth compensation grayscale corresponding to the third original grayscale of the first subpixel is determined according to the difference between the first compensation grayscale and the third compensation grayscale and relative magnitude of values of the third compensation grayscale, the first original grayscale, and the second original grayscale. The sixth compensation grayscale may be determined in the same way.

In an embodiment, after the step S1, the method may also include, but is not limited to, the following step including: controlling a first part of third subpixels in the first display portion and a first part of fourth subpixels in the second display portion to emit light under the first original grayscale, controlling a second part of third subpixels in the first display portion to emit light under the first compensation grayscale, and controlling a second part of fourth subpixels in the second display portion to emit light under the second compensation grayscale, where a color of the third subpixel and a color of the fourth subpixel are the same, and are different from the color of the first subpixel.

That is, the first display portion further includes a plurality of third subpixels, the second display portion further includes a plurality of fourth subpixels, the color of the third subpixel and the color of the fourth subpixels are the same and different from the color of the first subpixel.

Specifically, in this embodiment, the first compensation grayscale and the second compensation grayscale corresponding to the first original grayscale of the first subpixel and the second subpixel having the same color are taken as two compensation grayscales corresponding to the first original grayscale of the third subpixel and the fourth subpixel having another same color, which may reduce the entire calculation amount. The first subpixel and the second subpixel may both be green, which is the most important color causing the “boundary line” in the prior art. The corresponding compensation data may also be applied to subpixels of other colors.

The present disclosure also provides display panels for performing the compensation method as described in any one of the above embodiments.

The present disclosure also provides devices for generating compensation grayscales, and the device is configured to generate the first compensation grayscale and the second compensation grayscale as described in any one of the above embodiments.

The present disclosure provides display panels, compensation methods thereof, and devices for generating compensation grayscales. The first compensation grayscale corresponding to the first original grayscale of the first subpixel in the first display portion is obtained, and the compensation grayscale corresponding to the first original grayscale of the second subpixel in the second display portion is obtained, the color of the first subpixel and the color of the second subpixel are the same, the first compensation grayscale is determined at least by the second brightness of the second subpixel under the first original grayscale, and the second compensation grayscale is determined at least by the first brightness of the first subpixel under the first original grayscale; the first part of the first subpixels and the first part of the second subpixels are controlled to emit light under the first original grayscale, and the second part of the first subpixels are controlled to emit light under the first compensation grayscale, and the second part of the second subpixels are controlled to emit light under the second compensation grayscale. Thus, the brightness difference of the display images in different areas of the display panel are effectively reduced and the overall uniformity of the display images is improved.

The display panels, the compensation methods thereof, and the devices for generating compensation grayscales provided by the embodiments of the present disclosure have been introduced in detail. This paper uses specific examples to illustrate the principles and implementation methods of the present disclosure. The description of the above embodiments is only to help understand the technical solutions and core ideas of the present disclosure. Those of ordinary skill in the art should understand: it is still possible to modify the technical solutions recorded in the foregoing embodiments, or to equivalently replace some of the technical features; but these modifications or substitutions do not cause the essence of the corresponding technical solutions to depart from the scope of the technical solutions of the embodiments of the present disclosure.

The invention claimed is:

1. A compensation method of a display panel, comprising:

dividing a display area of the display panel to at least a first display portion and a second display portion, wherein the first display portion comprises a plurality of first subpixels, the second display portion comprises a plurality of second subpixels, colors of the first subpixels and colors of the second subpixels are same;

obtaining a first compensation grayscale corresponding to a first original grayscale of the first subpixels, and obtaining a second compensation grayscale corresponding to a first original grayscale of the second subpixels, wherein the first compensation grayscale is determined at least by a second brightness of the second subpixels under the first original grayscale, and the second compensation grayscale is determined at least by a first brightness of the first subpixels under the first original grayscale; and controlling a first part of the first subpixels and a first part of the second subpixels to emit light under the first original grayscale, controlling a second part of the first subpixels to emit light under the first compensation grayscale, and controlling a second part of the second subpixels to emit light under the second compensation grayscale.

2. The compensation method of the display panel according to claim 1, wherein a step of obtaining the first compensation grayscale corresponding to the first original grayscale of the first subpixels, and obtaining the second compensation grayscale corresponding to the first original grayscale of the second subpixels comprises:

obtaining the first brightness of the first subpixels in the first display portion under the first original grayscale, and obtaining the second brightness of the second subpixels in the second display portion under the first original grayscale; and determining the first compensation grayscale corresponding to the first subpixels at least by the second brightness, and determining the second compensation grayscale corresponding to the second subpixels at least by the first brightness.

3. The compensation method of the display panel according to claim 1, wherein the first compensation grayscale is a grayscale value corresponding to the second brightness of the first subpixels, and the second compensation grayscale is a grayscale value corresponding to the first brightness of the second subpixels.

4. The compensation method of the display panel according to claim 1, wherein a number of first subpixels in the first part of the first subpixels is equal to a number of second subpixels in the second part of the second subpixels, and a number of first subpixels in the second part of the first subpixels is equal to a number of second subpixels in the first part of the second subpixels.

5. The compensation method of the display panel according to claim 4, wherein the first part of the first subpixels comprise a plurality of first subpixel groups, the second part of the first subpixels comprise a plurality of second subpixel groups, and the plurality of first subpixel groups and the plurality of second subpixel groups are alternately arranged along a first direction; and wherein the first part of the second subpixels comprise a plurality of third subpixel groups, the second part of the second subpixels comprise a plurality of fourth subpixel groups, and the plurality of third subpixel group and the plurality of fourth subpixel groups are alternately arranged along the first direction.

6. The compensation method of the display panel according to claim 1, wherein the display panel comprises a first source driver chip and a second source driver chip, and the first display portion and the second display portion are electrically connected to the first source driving chip and the second source driving chip, respectively; or the first display portion and the second display portion are both electrically connected to the first source driver chip, and resistances between them and the first source driver chip are different.

7. The compensation method of the display panel according to claim 2, wherein the display panel comprises a first source driver chip and a second source driver chip, and the first display portion and the second display portion are electrically connected to the first source driving chip and the second source driving chip, respectively; or the first display portion and the second display portion are both electrically connected to the first source driver chip, and resistances between them and the first source driver chip are different.

8. The compensation method of the display panel according to claim 3, wherein the display panel comprises a first source driver chip and a second source driver chip, and the first display portion and the second display portion are electrically connected to the first source driving chip and the second source driving chip, respectively; or the first display portion and the second display portion are both electrically connected to the first source driver chip, and resistances between them and the first source driver chip are different.

9. The compensation method of the display panel according to claim 6, further comprising:

dividing the display area of the display panel to at least further comprise a third display portion and a fourth display portion, wherein the third display portion comprises a plurality of third subpixels, the fourth display portion comprises a plurality of fourth subpixels, and colors of the third subpixels and colors of the fourth subpixels are same with the colors of the first subpixels;

obtaining a third compensation grayscale corresponding to a first original grayscale of the third subpixels, and obtaining a fourth compensation grayscale corresponding to a first original grayscale of the fourth subpixels, wherein the third compensation grayscale is determined at least by a fourth brightness of the fourth subpixels under the first original grayscale, and the fourth compensation grayscale is determined at least by a third brightness of the third subpixels under the first original grayscale;

dividing the display area of the display panel to at least further comprise a fifth display portion and a sixth display portion, wherein the fifth display portion comprises a plurality of fifth subpixels, the sixth display portion comprises a plurality of sixth subpixels, and colors of the fifth subpixels and colors of the sixth subpixels are same with the colors of the first subpixels;

determining a fifth compensation grayscale corresponding to a first original grayscale of the fifth subpixels according to the first compensation grayscale and the third compensation grayscale, and determining a sixth compensation grayscale corresponding to a first original grayscale of the sixth subpixels according to the second compensation grayscale and the fourth compensation grayscale; and controlling a first part of the fifth subpixels and a first part of the sixth subpixels to emit light under the first original grayscale, controlling a second part of the fifth subpixels to emit light under the fifth compensation grayscale, and controlling a second part of the sixth subpixels to emit light under the sixth compensation grayscale, wherein the first display portion, the third display portion, and the fifth display portion are all electrically connected to the first source driver chip, and there are a first resistance, a third resistance, and a fifth resistance respectively between the three and the first source driver chip; the second display portion, the fourth display portion, and the sixth display portion are all electrically connected to the second source driver chip, and there are a second resistance, a fourth resistance, and a sixth resistance respectively between the three and the second source driver chip; and the first resistance is equal to the second resistance, the third resistance is equal to the fourth resistance, and the fifth resistance is equal to the sixth resistance; or wherein the first display portion and the second display portion are both electrically connected to the first source driver chip, and there are a first resistance and a second resistance respectively between the two and the first source driver chip; the third display portion and the fourth display portion are both electrically connected to the second source driver chip, and there are a third resistance and a fourth resistance respectively between the two and the second source driver chip; the fifth display portion and the sixth display portion are both electrically connected to a third source driver chip, and there are a fifth resistance and a sixth resistance respectively between the two and the third source driver chip; and the first resistance, the third resistance, and the fifth resistance are equal, and the second resistance, the fourth resistance, and the sixth resistance are equal.

10. The compensation method of the display panel according to claim 9, further comprising:

determining the third compensation grayscale corresponding to the first original grayscale of the third subpixels according to the first compensation grayscale and the second compensation grayscale; and controlling a first part of the third subpixels to emit light under the first original grayscale, and controlling a second part of the third subpixels to emit light under the third compensation grayscale, wherein the first display portion, the second display portion, and the third display portion are all electrically connected to the first source driver chip; or the first display portion, the second display portion, and the third display portion are electrically connected to the first source driver chip, the second source driver chip, and the third source driver chip, and resistances respectively between the first display portion and the first source driver chip, between the second display portion and the second source driver chip, and between the third display portion and the third source driver chip are same.

11. The compensation method of the display panel according to claim 1, further comprising:

obtaining a third compensation grayscale corresponding to a second original grayscale of the first subpixels, and obtaining a fourth compensation grayscale corresponding to a second original grayscale of the second subpixels, wherein the third compensation grayscale is determined at least by a fourth brightness of the second subpixels under the second original grayscale, and the fourth compensation grayscale is at least determined by a third brightness of the first subpixels under the second original grayscale; and determining a fifth compensation grayscale corresponding to a third original grayscale of the first subpixels according to the first compensation grayscale and the third compensation grayscale, and determining a sixth compensation grayscale corresponding to a third original grayscale of the second subpixels according to the second compensation grayscale and the fourth compensation grayscale.

12. The compensation method of the display panel according to claim 2, further comprising:

obtaining a third compensation grayscale corresponding to a second original grayscale of the first subpixels, and obtaining a fourth compensation grayscale corresponding to a second original grayscale of the second subpixels, wherein the third compensation grayscale is determined at least by a fourth brightness of the second subpixels under the second original grayscale, and the fourth compensation grayscale is at least determined by a third brightness of the first subpixels under the second original grayscale; and determining a fifth compensation grayscale corresponding to a third original grayscale of the first subpixels according to the first compensation grayscale and the third compensation grayscale, and determining a sixth compensation grayscale corresponding to a third original grayscale of the second subpixels according to the second compensation grayscale and the fourth compensation grayscale.

13. The compensation method of the display panel according to claim 1, before a step of obtaining the first compensation grayscale corresponding to the first original grayscale of the first subpixels, and obtaining the second compensation grayscale corresponding to the first original grayscale of the second subpixels, further comprising:

obtaining a first mapping relationship between a brightness value and a grayscale value of the first subpixels, and obtaining a second mapping relationship between a brightness value and a grayscale value of the second subpixels, wherein the first brightness, the second brightness, the first compensation grayscale, and the second compensation grayscale are determined according to the first mapping relationship and the second mapping relationship.

14. The compensation method of the display panel according to claim 1, wherein the first display portion further comprises a plurality of third subpixels, the second display portion further comprises a plurality of fourth subpixels, and colors of the third subpixels and colors of the fourth subpixels are same and different from the colors of the first subpixels; and after a step of obtaining the first compensation grayscale corresponding to the first original grayscale of the first subpixels, and obtaining the second compensation grayscale corresponding to the first original grayscale of the second subpixels, the compensation method further comprises:

controlling a first part of the third subpixels and a first part of the fourth subpixels to emit light under the first original grayscale, controlling a second part of the third subpixels to emit light under the first compensation grayscale, and controlling a second part of the fourth subpixels to emit light under the second compensation grayscale.

15. A display panel, wherein the display panel is configured to execute the compensation method of the display panel as claimed in claim 1.

16. The compensation method of the display panel according to claim 1, wherein a step of obtaining the first compensation grayscale corresponding to the first original grayscale of the first subpixels, and obtaining the second compensation grayscale corresponding to the first original grayscale of the second subpixels comprises:

obtaining the first brightness of the first subpixels in the first display portion under the first original grayscale, and obtaining the second brightness of the second subpixels in the second display portion under the first original grayscale; and determining the first compensation grayscale corresponding to the first subpixels at least by the second brightness, and determining the second compensation grayscale corresponding to the second subpixels at least by the first brightness.

17. The compensation method of the display panel according to claim 1, wherein the first compensation grayscale is a grayscale value corresponding to the second brightness of the first subpixels, and the second compensation grayscale is a grayscale value corresponding to the first brightness of the second subpixels.

18. The compensation method of the display panel according to claim 1, wherein a number of first subpixels in the first part of the first subpixels is equal to a number of second subpixels in the second part of the second subpixels, and a number of first subpixels in the second part of the first subpixels is equal to a number of second subpixels in the first part of the second subpixels.

19. The compensation method of the display panel according to claim 1, wherein the display panel comprises a first source driver chip and a second source driver chip, and the first display portion and the second display portion are electrically connected to the first source driving chip and the second source driving chip, respectively; or the first display portion and the second display portion are both electrically connected to the first source driver chip, and resistances between them and the first source driver chip are different.

20. A device for generating compensation grayscales, wherein the device is configured to generate the first compensation grayscale and the second compensation grayscale as claimed in claim 1.

* * * * *